United States Patent
Schmidt

(10) Patent No.: US 6,612,514 B1
(45) Date of Patent: Sep. 2, 2003

(54) ROTATION TENSIONER WITH AN INERTIA ELEMENT

(75) Inventor: Martin Schmidt, Elmshorn (DE)

(73) Assignee: Autoliv Development AB (SE)

( * ) Notice: Subject to any disclaimer, the term of this patent is extended or adjusted under 35 U.S.C. 154(b) by 17 days.

(21) Appl. No.: 10/019,905

(22) PCT Filed: Jun. 27, 2000

(86) PCT No.: PCT/EP00/05978
§ 371 (c)(1),
(2), (4) Date: Dec. 28, 2001

(87) PCT Pub. No.: WO01/00460
PCT Pub. Date: Jan. 4, 2001

(30) Foreign Application Priority Data

Jun. 28, 1999 (DE) .......................... 199 29 387

(51) Int. Cl.$^7$ ........................... B65H 75/48; B60R 22/46
(52) U.S. Cl. ........................................ 242/374
(58) Field of Search ............................. 242/374, 379.1; 280/806, 807; 297/476, 477, 478

(56) References Cited

U.S. PATENT DOCUMENTS

| | | | | |
|---|---|---|---|---|
| 4,442,674 A | * | 4/1984 | Fohl | 242/374 |
| 5,881,962 A | * | 3/1999 | Schmidt et al. | 242/374 |
| 6,419,176 B1 | * | 7/2002 | Mizuno | 242/374 |
| 6,532,739 B2 | * | 3/2003 | Kameyoshi et al. | |

FOREIGN PATENT DOCUMENTS

| | | |
|---|---|---|
| DE | 9405834 | 10/1994 |
| DE | 19512660 | 10/1995 |
| DE | 196026549 | 8/1996 |
| WO | WO 97/13660 | 4/1997 |
| WO | WO 97/13661 | 4/1997 |
| WO | WO 97/43149 | 11/1997 |

* cited by examiner

*Primary Examiner*—William A. Rivera
(74) *Attorney, Agent, or Firm*—R W Becker & Associates; R W Becker

(57) ABSTRACT

The invention relates to a rotation tensioner for a safety belt, especially for motor vehicles. Said ration tensioner comprises a belt retractor whose belt retraction pin is rotated in the belt retracting direction by means of an allocated drive when the rotation tensioner coupled to said pin is actuated. Said drive consists of a drive wheel with an external toothing for the belt retraction pin and of a channel that extends across at least part of the periphery of the drive wheel. Inertia elements are passed through said channel that are accelerated inside said channel and that engage with the external toothing of the drive wheel when the system is triggered. The invention provides a shaped element (16) that consists of an inertia body (18) and a leading finder element (17, 28) that allows a synchronous, shape-congruent insertion of the inertia elements (18) into the outer toothing (13) of the drive wheel (11).

15 Claims, 2 Drawing Sheets

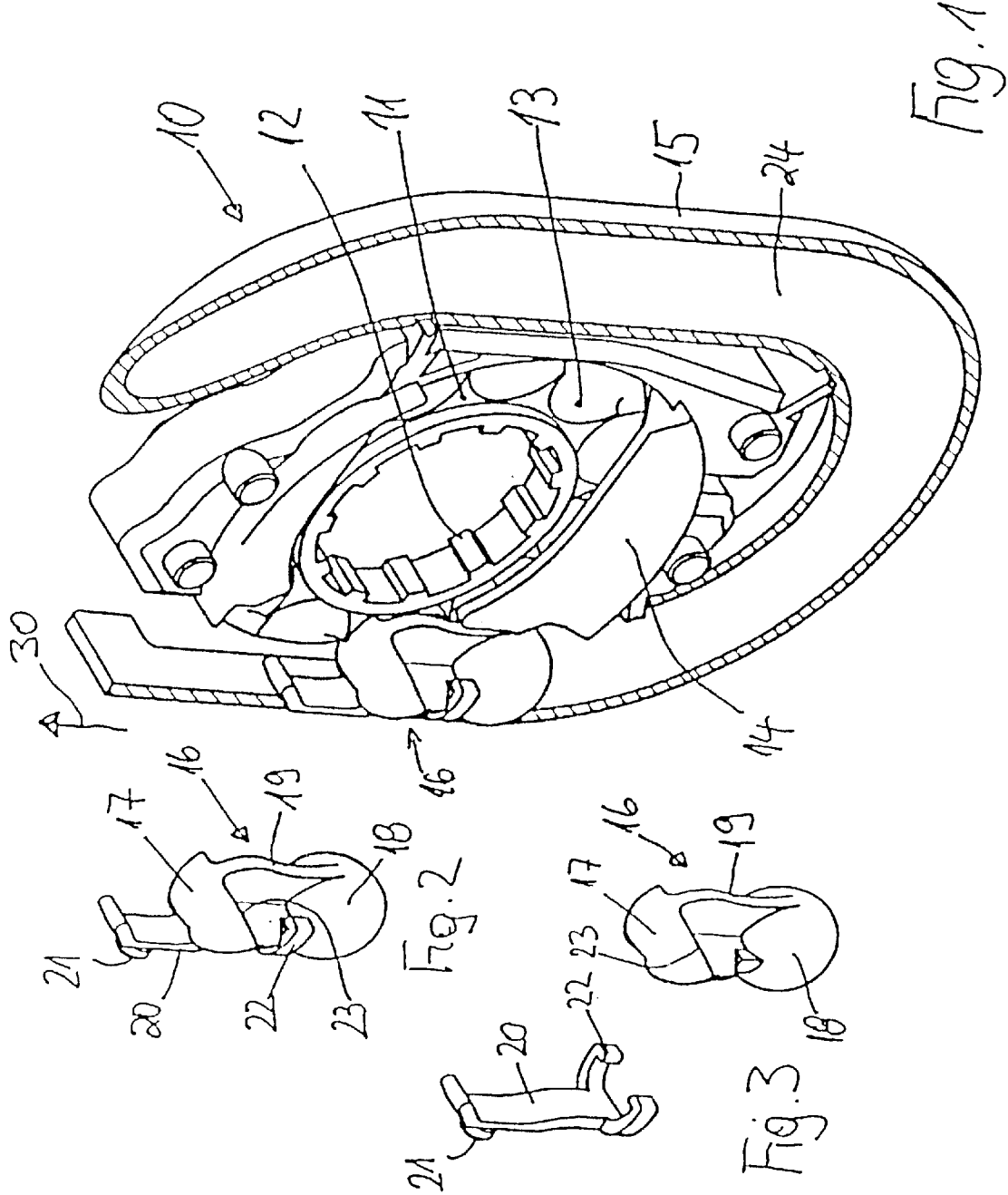

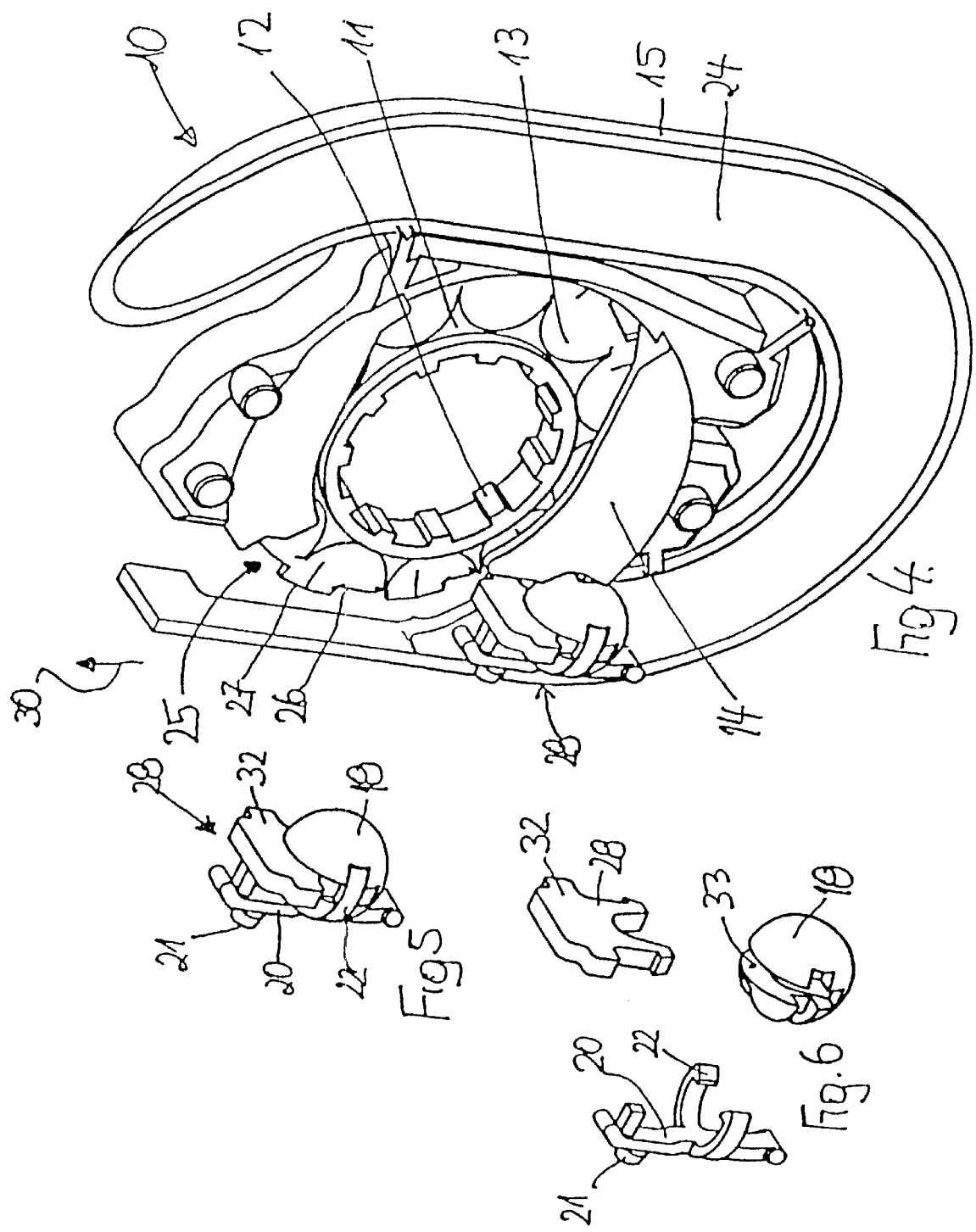

ROTATION TENSIONER WITH AN INERTIA ELEMENT

BACKGROUND OF THE INVENTION

The invention is a rotary tensioner for a safety belt, in particular in motor vehicles, with a belt retractor, the belt retraction spool of which is rotated in the belt retracting direction by an associated drive when the rotary tensioner coupled thereto is actuated, whereby the drive comprises a drive wheel that has exterior teeth for the spool, and a channel that extends about at least a portion of the periphery of the drive wheel for conducting therethrough inertia elements that are accelerated in the channel when the system is triggered and that engage the exterior teeth of the drive wheel.

DE 195 12 660 A1 describes a rotary tensioner with the aforesaid features, addressing the problem that when the first inertia element reaches the exterior teeth of the drive wheel, the passage of the subsequent inertia elements can be blocked by the drive wheel, or there can at least be interference in the proper functioning of the drive process. The solution provided for this in the generic document is inadequate, namely adjusting a resilience or elasticity of the components in question in the region in which the inertia elements and drive wheel meet one another in order to prevent mutual blocking of inertia elements and drive wheel due to a possible shifting in components designed in this manner.

The object of the invention is therefore to assure in a generic rotary tensioner that the inertia elements run across the drive wheel undisturbed with form-fit engagement of the inertia elements in its exterior teeth.

SUMMARY OF THE INVENTION

This object is achieved, including advantageous further developments of the invention, from the contents of the patent claims that follow this specification.

The basic idea of the invention is that a shaped element, comprising an inertia element and a leading finder element, is provided for the synchronous, shape-congruent introduction of the inertia elements into the exterior teeth of the drive wheel. In a simple manner and without substantial constructive complexity, this synchronizes the arrival of successive inertia elements and the position of the drive wheel, and of its exterior teeth, in that when the position of the exterior teeth of the drive wheel is not synchronous with the first incoming inertia element, the leading finder element corrects the position of the drive wheel, and of the affected recess of the exterior teeth, so that each of the subsequent inertia elements achieves an undisturbed form-fit with the exterior teeth of the drive wheel.

In a first embodiment, the invention provides that the shaped element comprises as finder element a first inertia element having only a partial contour of a complete inertia element adapted to the external teeth of the drive wheel, and also comprises a complete second inertia element integrally joined thereto via a connecting rib. This solution is based on the principle that due to the only partial contour of the first inertia element in the framework of the shaped element, the first inertia element as finder can enter into this recess until it is adjacent to the surface of the recess affected by the partial contour in the drive direction, independent of the position of the associated recess of the exterior teeth of the drive wheel, and thus if necessary corrects the position of the drive wheel so that the second inertia element, which is integrally joined to the first inertia element as a component of the shaped element and which thus is fixed in its association to the first inertia element, enters into the recess associated with it in a synchronized manner. This also ensures the passage of the further inertia elements following the second inertia element.

In terms of the embodiment of a double sphere comprising two inertia elements joined to one another, known from DE 196 02 549 A1, for achieving a sealing effect with an arrangement provided with a seal, this is located on the end allocated to the pyrotechnic drive, alternatively also on the other end, but the succession of inertia elements has no effect on the passage of the inertia elements through the exterior teeth of the drive wheel, which passage is to be improved.

The partial contour of the first inertia element in the framework of the shaped element is formed in accordance with one exemplary embodiment of the invention in that the partial contour of the first inertia element comprises a hemisphere oriented in the drive direction, whose terminating plane facing the second inertia element is arranged at an angle to the radius line of the drive wheel. This makes it possible for the first inertia element to fit the critical tooth of the exterior teeth of the drive wheel. When the following tooth is encountered, which theoretically is also located in a critical position, no blockage occurs because in this case the collision leads to a beginning rotary of the drive wheel due to the orientation of the tooth, changed by one tooth division, relative to the incoming inertia element.

In accordance with one exemplary embodiment of the invention, it is provided that the connecting rib at least partially continues the missing contour of the first inertia element to the second inertia element; this improves the orientation of the shaped element, i.e. the first inertia element relative to the teeth.

Known in the prior art is separating the drive wheel into two symmetrical halves; in accordance with one exemplary embodiment of the invention it is provided that the connecting rib engages between the halves of the drive wheel and the shaped element is guided thereby.

In a second exemplary embodiment of the invention it is provided that the finder element of the shaped element is embodied as a flat component that can be guided between the exterior edge of the drive wheel and the interior wall of the channel, and the drive wheel has formed on its exterior rim as control teeth a second set of teeth, whereby the exterior teeth, for receiving the inertia elements, and the control teeth, for cooperating with the finder component of the shaped element, are arranged relative to one another in such a way that the finder component, when there is a fitting association of the first inertia element that is attached to it to a recess of the exterior teeth, encounters the exterior contour of a tooth ridge located between the gaps of the control teeth and, during a critical association of inertia elements to the exterior teeth, engages a gap of the control teeth and rotates the drive wheel into the fitting position by pushing against the tooth flank.

This design is based on the principle that the finder is embodied as a finder component that cooperates with second control teeth formed on the drive wheel and that if necessary causes a correction in the position of the drive wheel. If the finder component encounters a tooth of the control teeth of the drive wheel, the control teeth are arranged relative to the exterior teeth of the drive wheel that receive the inertia elements such that the inertia element attached to the finder component enters the associated recess of the drive wheel synchronously; if the finder component encounters a gap of the control teeth, the position of the drive wheel is not synchronous to the entering inertia element, and in this case the finder component has a certain amount of play in the gap and due to abutment against the end of the gap in the drive direction of the drive wheel leads to a correction in position such that the exterior teeth of the drive wheel are synchronous to the entering inertia elements.

In accordance with one exemplary embodiment of the invention it is provided that the finder component is embodied as a T-shaped component with a T-piece that cooperates with the control teeth and is connected to the first inertia element, which is embodied as a sphere. In accordance with exemplary embodiments of the invention it can be provided that the finder component and the first inertia element are embodied integrally with one another, or that the finder component is spread open at its free end opposing the T-piece and thus engages the sphere in a form-fit in an associated groove. Preferably the T-shaped finder component can be embodied as a solid metal part.

In addition, for both embodiments of the invention it can be provided that the shaped element is fixed in its starting position by a clip fixed in the wall of the tubular housing that forms the channel; this is associated with the advantage that the inertia element is secured in its rest state via the shaped element joined to the clip; at the same time the clip makes it possible to align the shaped element with regard to the orientation of its longitudinal axis and with regard to a rotational orientation in the channel of the tubular housing. If the clip has a spring pre-tensioning or is plastically deformable due to its configuration, the clip additionally ensures a movement of the shaped element via the drive wheel to the extent that the shaped element can shift by a certain amount between the channel and the drive wheel, as is in particular necessary for the embodiment of the invention with the T-shaped finder component.

In accordance with one exemplary embodiment of the invention, the clip is advantageously fixed in the wall of the tubular housing by means of a shear pin.

In accordance with one exemplary embodiment of the invention it can be provided that the clip has a spring arm engaging between two inertia elements and pressing the series of successive inertia elements together, whereby the chain of inertia elements is pressed with no play against the securely clamping piston on the other end of the chain of inertia elements and the system is thereby prevented from chattering.

BRIEF DESCRIPTION OF THE DRAWINGS

Exemplary embodiments of the invention are illustrated in the drawing and described in the following. In the drawings:

FIG. 1 is a cross-sectional view of a first embodiment of the drive of a rotary tensioner in a partial illustration;

FIG. 2 is a perspective view of the shaped element including its clip holder;

FIG. 3 is the subject of FIG. 2 with the shaped part and clip illustrated apart and individually;

FIG. 4 is a second exemplary embodiment of the drive of a rotary tensioner in a drawing corresponding to that in FIG. 1;

FIG. 5 is a perspective view of the shaped element used for the subject of FIG. 4, including its clip holder;

FIG. 6 is the subject of FIG. 5 with the shaped part and clip illustrated apart and individually.

DESCRIPTION OF PREFERRED EMBODIMENT

The basic design of a drive for a rotary tensioner is described in detail in DE 195 12 660 A1, cited in the foregoing so that to the extent relevant reference is made thereto. The present drawing merely encompasses the further-developed features of the drive 10 of a rotary tensioner as illustrated in FIG. 1. Visible is one half of the drive wheel 11, constructed or constructable from two symmetrical halves, that with interior teeth 12 can be joined in a form-fit or positive manner to a belt retraction shaft or spool (not shown) of a belt retractor. The drive wheel 11 has on its exterior circumference exterior teeth 13, whereby the individual recesses of these exterior teeth are caps or segments that are spherical in shape, because in the illustrated exemplary embodiment as well as in the cited prior art the inertia elements are embodied as spheres. The illustrated half of the drive wheel 11 is guided by a brace 14 so that the half (not shown) that completes the drive wheel 11 can be placed against this brace.

Arranged in the plane of the drive wheel 11 is a curved tubular housing 15, in the interior channel 24 of which are stored the spherical inertia elements (not shown in detail) that accelerate the drive wheel 11. Arranged at the forward end (in the drive direction, arrow 30) of the chain of inertia elements (not shown in detail) is a shaped element 16 that is formed by the integral joining of a first inertia sphere 17 to a second inertia sphere 18, whereby the first inertia sphere 17 is formed as a finder element and for this reason forms only a partial contour of a complete inertia sphere. This partial contour comprises a hemisphere, whereby its terminating plane 23 facing the second inertia element 18 is arranged at an angle to the radius line of the drive wheel 11. The first inertia sphere 17 is integrally joined to the complete second inertial element 18 via a narrow connecting rib 19, whereby the connecting rib 19 continues, at least partially, in its region facing the drive wheel 11, the missing contour of the first inertia element 17 before it runs into the completely formed second inertia element 18.

The shaped element 16 formed by the first inertia sphere 17 and the second inertia sphere 18 together is held by a clip 20 that itself can be attached in the starting position in the wall of the curved tubular housing 15 via a shear pin 21, whereby the clip 20 is connected to the shaped element 16 by arms 22 laterally engaging the shaped element 16 in an associated groove.

During the operation of the belt retractor when the belt is winding and unwinding during normal buckling processes, the positions of the recesses of the outer teeth 13 of the drive wheel 11 change with respect to the shaped element 16 and its first inertia sphere 17 so that when the pyrotechnic drive apparatus is actuated it can happen for the inertia spheres that positions of the exterior teeth 13 of the drive wheel 11 are not synchronized with the shaped element 16. If the shear pin 21 is separated because the retractor is actuated, the clip 20 together with the shaped element 16 moves in the channel 24 of the curved tubular housing 15 in the direction of the arrow 30, whereby first the first inertia sphere 17 of the shaped element 16 enters an associated recess of the exterior teeth 13 of the drive wheel 11. Since this first inertia sphere 17 has only a partial contour in the form of a hemisphere placed at an incline to the drive direction, there is sufficient play so that regardless of the position of the drive wheel 11 the hemisphere can enter into one of the recesses of the exterior teeth 13. Also, if necessary, the position of the drive wheel 11 is corrected by the orientation of the circumferential surface of the hemisphere relative to the terminating plane of the recess of the exterior teeth 13, so that the subsequent second inertia sphere 18 enters into the teeth 13 in a synchronized manner as a component of the shaped element 16, this also ensuring the synchronization of the exterior teeth 13 for the subsequent inertia spheres.

FIGS. 2 and 3 illustrate additional details in the design of shaped element 16 and clip 20. As not illustrated in more detail, the clip 20 can also be designed with a spring element, by means of which the chain of successive inertia spheres is maintained with no play and with no chattering against the securing piston on the opposite end of the chain of inertia spheres.

FIGS. 4 through 6 illustrate an alternative embodiment of the invention in which the drive wheel is additionally provided on its exterior circumference with second control teeth 25 that comprise a sequence of largely rectangular teeth 27 and gaps 26. The associated shaped element 16 in this exemplary embodiment is formed by a first inertia sphere 18 that is combined with a T-shaped flat component 28 as finder, whereby the T-piece 32 of the finder component 28 forms the finder tooth that cooperates with the control teeth 25; the free end of the T-shaped component 28 is spread open and thus engages the attached first inertia sphere 18 in an associated groove 33. Alternatively finder component 28 and first inertia sphere 18 can be embodied integrally. The shaped element 16 formed in this manner is itself again held in the curved tubular housing 15 via a clip 20 corresponding to the description for the exemplary embodiment in accordance with FIGS. 1 through 3.

When the drive is actuated, if the T-piece 32 of the finder component 28 as finder tooth reaches a tooth 27, due to the allocation of the control teeth 25 to the exterior teeth 13 receiving inertia spheres, it is assured that the entry of the first inertia sphere 18 is synchronized, as is that of the subsequent inertia spheres. If the T-piece 32 of the finder component 28 as finder tooth reaches a gap 26 of the control teeth 25, then an unfavorable alignment of the associated recess of the exterior teeth 13 to the first inertia sphere 18 occurs, but it is nevertheless corrected in that the finder component 28 pushes ahead in the gap 26 in the drive direction (arrow 30) until it reaches the terminating wall of the gap 26 and here it corrects the position of the drive wheel 11 such that the position of the exterior teeth 13 are synchronized with the inertia spheres.

The features of the subject disclosed in this document in the foregoing specification, patent claims, abstract, and drawing can be essential individually or in any desired combination for realizing the invention in its various embodiments.

The specification incorporates by reference the disclosure of German priority document 199 29 387.2 of Jun. 28, 1999 and International priority document PCT/EP00/05978 of Jun. 27, 2000.

The present invention is, of course, in no way restricted to the specific disclosure of the specification and drawings, but also encompasses any modifications within the scope of the appended claims.

What is claimed is:

1. A rotary tensioner for a safety belt, comprising:
   a belt retractor having a belt retraction spool; and
   a drive means for rotating said spool in a belt retracting direction upon actuation of said tensioner, wherein said drive means comprises a drive wheel, which is provided with external teeth, for said spool, and further comprises a housing that extends about at least a portion of a periphery of said drive wheel and has a channel for conducting therethrough inertia elements that are loosely disposed in said channel and that upon actuation of said tensioner are accelerated in said channel and come into engagement with said external teeth of said drive wheel, and wherein, for a synchronous and shape-congruent introduction of said inertia elements into said external teeth of said drive wheel, said drive means also comprises a shaped element that comprises as a finder element, a first inertia element having only a partial contour of a complete inertia element, wherein said partial contour is adapted to said external teeth of said drive wheel, and wherein said shaped element also comprises a complete second inertia element that is monolithically connected to said first inertia element via a connecting rib.

2. A rotary tensioner according to claim 1, wherein said inertia elements are embodied as spheres, wherein said partial contour of said first inertia element comprises a hemisphere that is oriented in a drive direction, and wherein a delimiting plane of said first inertia element faces said second inertia element and is disposed at an angle to a radius line of said drive wheel.

3. A rotary tensioner according to claim 1, wherein said connecting rib at least partially continues the missing contour of said first inertia element to said second inertia element.

4. A rotary tensioner according to claim 1, wherein said drive wheel comprises two symmetrical halves, and wherein said connecting rib engages between said halves and thereby guides said shaped element.

5. A rotary tensioner according to claim 1, wherein said housing is a tubular housing that forms said channel, wherein a clip is fixed in position in a wall of said tubular housing, and wherein said shaped element is fixed in a starting position by means of said clip.

6. A rotary tensioner according to claim 5, wherein said clip is fixed in said wall of said tubular housing by means of a shear pin.

7. A rotary tensioner according to claim 5, wherein said clip is provided with a spring arm that engages between two inertia elements and presses a series of successive inertia elements against one another.

8. A rotary tensioner for a safety belt, comprising:
   a belt retractor having a belt retraction spool; and
   a drive means for rotating said spool in a belt retracting direction upon actuation of said tensioner, wherein said drive means comprises a drive wheel, which is provided with external teeth, for said spool, and is provided with control teeth on an outer rim, and further comprises a housing that extends about at least a portion of a periphery of said drive wheel and has a channel for conducting therethrough inertia elements that are loosely disposed in said channel and that upon actuation of said tensioner are accelerated in said channel and come into engagement with said external teeth of said drive wheel, and wherein, for a synchronous and shape-congruent introduction of said inertia elements into said external teeth of said drive wheel, said drive means also comprises a shaped element that comprises, connected to one another, a first inertia element and a leading finder element wherein said finder element is embodied as a flat component that is guidable in said channel between said outer rim of said drive wheel and an interior wall of said housing, wherein said external teeth for receiving said inertia elements, and said control teeth, for cooperating with said finder element, are disposed relative to one another such that when said first inertia element is associated in a fitting manner relative to a recess of said external teeth, said finder element encounters an outer contour of a tooth a disposed between gaps of said control teeth, in such that, during a critical association of said inertia elements to said external teeth said finder element engages a gap of said control teeth and rotates said drive wheel into a fitting position by pushing against a flank of said control teeth of said drive wheel.

9. A rotary tensioner according to claim 8, wherein said finder element is embodied as a T-shaped component having a T-piece that cooperates with said control teeth and is connected to said first inertia element, which is embodied as a sphere.

10. A rotary tensioner according to claim 9, wherein said finder element and said first inertia element are embodied as one piece with one another.

11. A rotary tensioner according to claim 9, wherein said finder element has a free end disposed across from said T-piece and wherein said free end is spread apart in order to engage a groove of said first inertia element in a positive manners.

12. A rotary tensioner according to claim 9, wherein said T-shaped finder element is embodied as a solid metal part.

13. A rotary tensioner according to claim 8, wherein said housing is a tubular housing that forms said channel, wherein a clip is fixed in position in a wall of said tubular housing, and wherein said shaped element is fixed in a starting position by means of said clip.

14. A rotary tensioner according to claim 13, wherein said clip is fixed in said wall of said tubular housing, by means of a shear pin.

15. A rotary tensioner according to claim 13, wherein said clip is provided with a spring arm that engages between two inertia elements and presses a series of successive inertia elements against one another.

* * * * *

UNITED STATES PATENT AND TRADEMARK OFFICE
CERTIFICATE OF CORRECTION

PATENT NO.   : 6,612,514 B1
DATED        : September 2, 2003
INVENTOR(S)  : Schmidt It is certified that error appears in the above-identified patent and that said Letters Patent is hereby corrected as shown below:

<u>Title page,</u>
Item [54], should read as follows:
-- [54]  ROTARY TENSIONER WITH AN INERTIA ELEMENT --

Signed and Sealed this

Twentieth Day of January, 2004

JON W. DUDAS
*Acting Director of the United States Patent and Trademark Office*